(12) United States Patent
Milanovic et al.

(10) Patent No.: US 8,000,816 B2
(45) Date of Patent: Aug. 16, 2011

(54) PROCESS CONTROL SYSTEM AND METHOD FOR OPERATING A SYSTEM OF THIS TYPE

(75) Inventors: Raiko Milanovic, Heidelberg (DE); Rolf Merte, Heidelberg (DE); Armin Gasch, Speyer (DE); Thomas Karte, Bruchköbel (DE); Andreas Stelter, Minden (DE); Wolfgang Lasarzik, Nenndorf (DE)

(73) Assignee: ABB Research Ltd, Zurich (CH)

( * ) Notice: Subject to any disclaimer, the term of this patent is extended or adjusted under 35 U.S.C. 154(b) by 728 days.

(21) Appl. No.: 10/590,649

(22) PCT Filed: Feb. 28, 2004

(86) PCT No.: PCT/EP2004/002001
§ 371 (c)(1),
(2), (4) Date: Jan. 4, 2007

(87) PCT Pub. No.: WO2005/083539
PCT Pub. Date: Sep. 9, 2005

(65) Prior Publication Data
US 2007/0270977 A1   Nov. 22, 2007

(51) Int. Cl.
*G05B 11/01* (2006.01)
*G05B 13/02* (2006.01)
*G05B 19/18* (2006.01)
*C21B 15/00* (2006.01)

(52) U.S. Cl. ............... 700/19; 73/724; 700/30; 700/250
(58) Field of Classification Search .................. 700/19, 700/30, 250; 73/724
See application file for complete search history.

(56) References Cited

U.S. PATENT DOCUMENTS

| | | | | |
|---|---|---|---|---|
| 4,232,364 A | * | 11/1980 | Bibbero | 700/32 |
| 4,445,180 A | * | 4/1984 | Davis et al. | 700/289 |
| 4,502,318 A | * | 3/1985 | Converse et al. | 73/1.28 |
| 4,766,759 A | * | 8/1988 | Cohrs et al. | 73/1.21 |
| 5,024,100 A | * | 6/1991 | Weinstein | 73/756 |
| 5,050,080 A | * | 9/1991 | Abe | 701/35 |
| 5,267,141 A | * | 11/1993 | Morita et al. | 700/32 |
| 5,291,479 A | * | 3/1994 | Vaziri et al. | 370/264 |
| 5,386,360 A | * | 1/1995 | Wilson et al. | 700/17 |
| 5,482,314 A | * | 1/1996 | Corrado et al. | 280/735 |

(Continued)

FOREIGN PATENT DOCUMENTS

DE   195 02 499 A1   8/1996

(Continued)

OTHER PUBLICATIONS

Mastern-M., "Electronics: The Intelligence in Intelligent Control", 1998, Pergamon, Annual Reviews in Control, pp. 1-7.*

*Primary Examiner* — Albert Decady
*Assistant Examiner* — Thomas Stevens
(74) *Attorney, Agent, or Firm* — Buchanan Ingersoll & Rooney PC

(57) ABSTRACT

The invention relates to a process control system having measuring devices and actuators. All of the measuring devices and actuators process information and exchange data amongst themselves. All measuring devices and actuators are interconnected to enable a bi-directional data exchange. Several, or all of the measuring devices and actuators can exchange data with a service unit that can be connected to the devices and actuators. The invention also relates to a method for operating a process control system of this type.

16 Claims, 2 Drawing Sheets

U.S. PATENT DOCUMENTS

| | | | |
|---|---|---|---|
| 6,014,612 A * | 1/2000 | Larson et al. | 702/183 |
| 6,198,079 B1 * | 3/2001 | Essig | 219/497 |
| 6,260,004 B1 * | 7/2001 | Hays et al. | 702/183 |
| 6,571,132 B1 * | 5/2003 | Davis et al. | 700/2 |
| 6,587,739 B1 * | 7/2003 | Abrams et al. | 700/83 |
| 6,701,232 B2 * | 3/2004 | Yamaki | 701/33 |
| 6,748,305 B1 * | 6/2004 | Klausner et al. | 701/35 |
| 6,803,854 B1 * | 10/2004 | Adams et al. | 340/531 |
| 6,907,302 B2 * | 6/2005 | Karbassi | 700/65 |
| 6,907,383 B2 * | 6/2005 | Eryurek et al. | 702/183 |
| 6,980,114 B2 * | 12/2005 | Kleinschmidt | 340/573.1 |
| 7,418,992 B2 * | 9/2008 | Pilavdzic | 164/154.1 |
| 7,484,008 B1 * | 1/2009 | Gelvin et al. | 709/249 |
| 2003/0144746 A1 * | 7/2003 | Hsiung et al. | 700/28 |
| 2003/0181996 A1 * | 9/2003 | Kirkpatrick et al. | 700/19 |
| 2003/0194088 A1 * | 10/2003 | Fischer et al. | 380/270 |
| 2004/0011716 A1 * | 1/2004 | Sandt et al. | 210/143 |
| 2004/0186613 A1 * | 9/2004 | Balling | 700/169 |
| 2006/0049961 A1 * | 3/2006 | Deck et al. | 340/870.07 |
| 2007/0271014 A1 * | 11/2007 | Breed | 701/29 |

FOREIGN PATENT DOCUMENTS

| | | |
|---|---|---|
| DE | 196 24 929 A1 | 1/1998 |
| DE | 199 10 426 A1 | 10/2000 |
| DE | 101 61 669 A1 | 6/2003 |
| DE | 102 17 646 A1 | 11/2003 |
| EP | 1 184 754 A2 | 3/2002 |
| WO | 03/049366 A2 | 6/2003 |

* cited by examiner

PROCESS CONTROL SYSTEM AND METHOD FOR OPERATING A SYSTEM OF THIS TYPE

This disclosure claims priority under 35 USC §371 to International Application No. PCT/EP2004/002001, filed Feb. 28, 2004, the contents of which are incorporated herein by reference.

The invention relates to a process control system, which expression means not only small but also large systems for open-loop and closed-loop control of a technical process. In particular, the invention relates to the sensor system used in this case and to the self-diagnosis of sensors, actuators and all other appliances which can interchange additional information in a process.

Any technical process which must be controlled is provided with sensors which determine the actual state of the process. The sensors in known systems pass on their measurement data to a central system. The measurement data, such as the temperature, frequently represents only indirectly desired information. The actually required information characterizing a process or a product is obtained by derivatives from the measurement data and by calculations.

Figure 2:
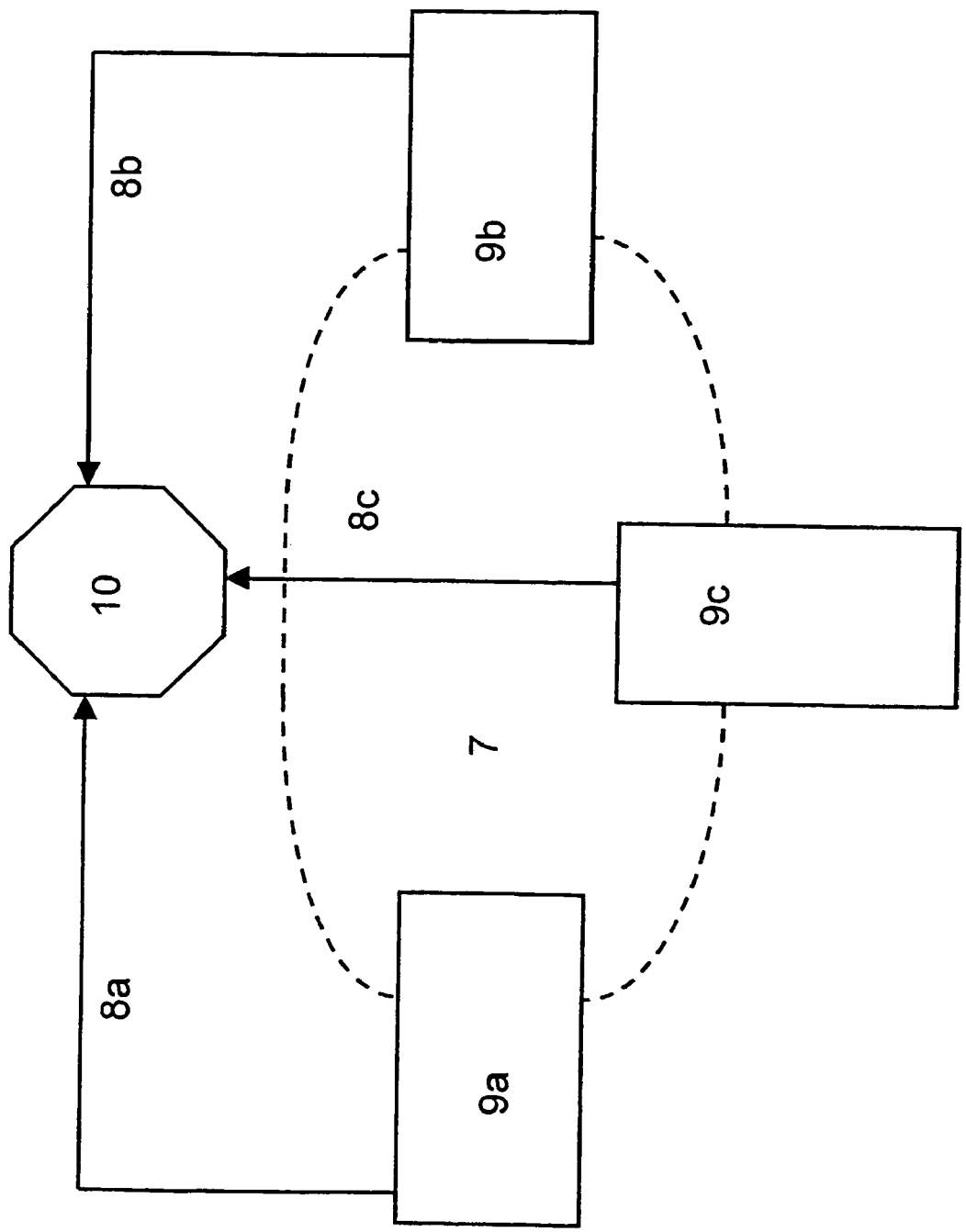

FIG. 2 shows a schematic illustration of one known arrangement for process control, in this case for determination of the flow. In this case, a process is annotated 7, with an associated temperature sensor 9a, a pressure sensor 9b and, possibly, further sensors 9c. The viscosity of the medium and its density are calculated from the measurement values recorded in this way. The flow is then obtained in accordance with Hagen-Poisseuille from the overall determined variables:

$$V = \Delta p_v * \pi * D^4 / (128 * \eta * 1)$$

η—viscosity
$\Delta p_v$—pressure loss
$D_s l$—tube geometry

This calculation is carried out at a central point, for example in a control console 10, to which all the measurement values are supplied via transmission paths 8a to 8c. The calculation result can be called up only at the control console 10.

The centralization of the measurement value processing which this results in has the disadvantage that data and information can be passed on only from the information node, that is to say from the control console, since this is the only place that the data processing algorithms are stored. For a local operator, for example at the location of a sensor, it is, however, often necessary to directly know the further-processed information in order to allow assessment of the process or the product. Furthermore, the measured variables are frequently only of indirect interest to the operator in order to obtain statements about the quality of a product or the status of an installation. For example, pressure is often measured only to determine the flow from it, and the temperature in order to determine the density and the viscosity of a medium from it.

The invention is thus based on the object of specifying a system with improved access to process information. A further aim is to specify a method for operation of a system such as this.

This object is achieved by a process control system which has the features specified in claim 1. Advantageous refinements and a method for operation of a system such as this are specified in further claims.

The invention accordingly proposes a process control system whose measurement devices and actuators are equipped with means for information processing and for data interchange between these measurement devices and actuators. The measurement devices and actuators are connected to one another, thus allowing data interchange. This results in a system with distributed intelligence in which, furthermore, all of the information relating to the process state is available in each measurement device and in each actuator. All of these devices have means for data processing, that is to say by way of example microcomputers with the necessary software, that is to say the required algorithms, such as the general gas equation, in order to allow calculation of the process information of interest.

Figure 1:
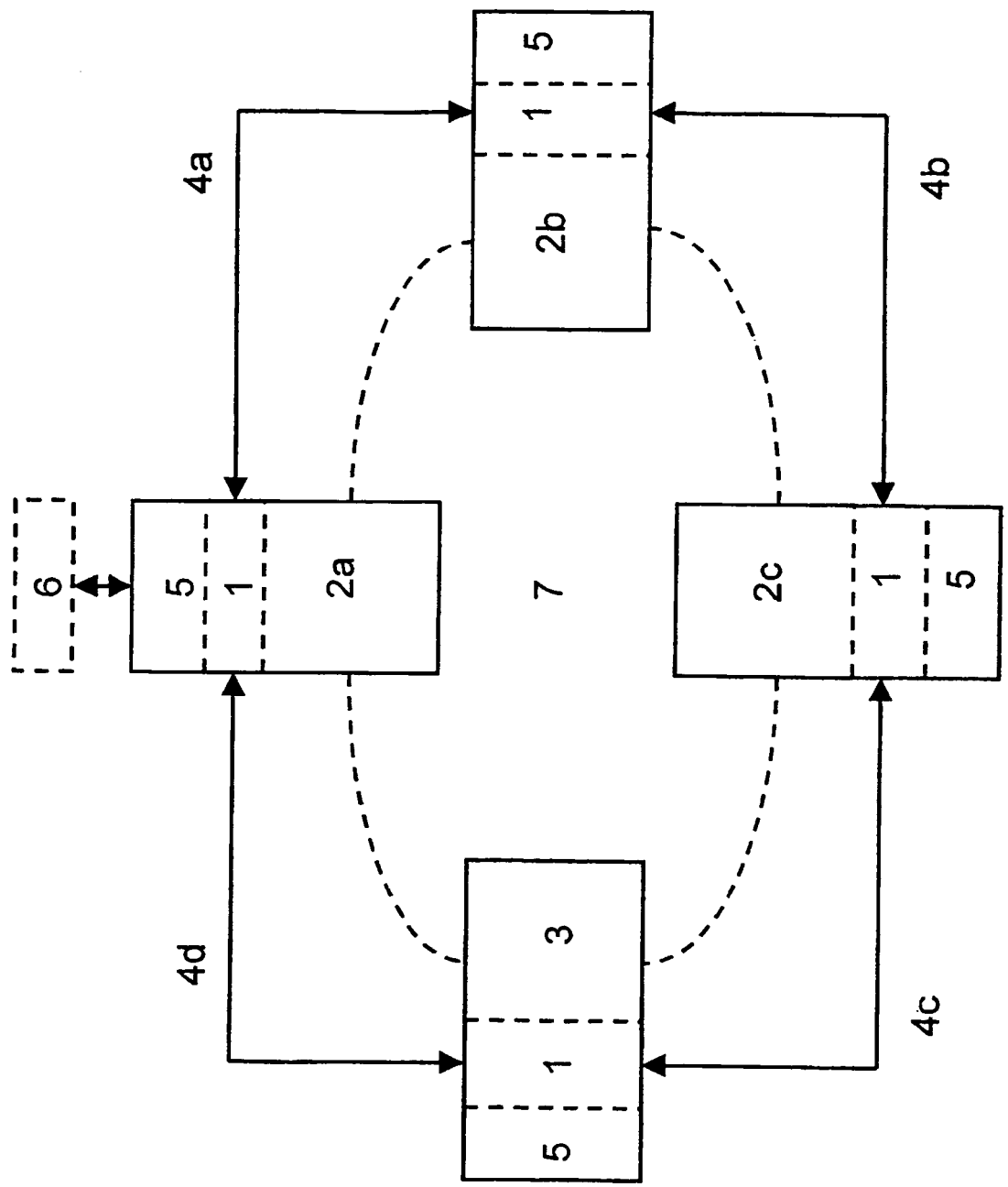

A further description of the process control system according to the invention as well as its method of operation and of the advantages associated with it will be given in the following text on the basis of one exemplary embodiment, which is illustrated in drawing figures, in which:

FIG. 1 shows, schematically, one possible arrangement of a process control system according to the invention, and FIG. 2 shows a corresponding arrangement for a process control system according to the prior art.

FIG. 1 shows a process 7 which has associated measurement devices with sensors 2a, 2b and 2c as well as an actuator 3 as components of a process control system. All of the measurement devices and actuators in a process control system such as this each contain a processing device 1 as well as an interface device 5 for connection of a service appliance 6, for example, a laptop or personal digital assistant (PDA). It is self-evident that the interface device 5 may also be omitted in exceptional cases, when there is no need to provide the capability to connect a service appliance 6 to the corresponding device or measurement point. By way of example, a microcomputer with associated software can be used as the processing device 1, with algorithms which are required in the system either being stored as standard in all of the microcomputers or being entered only in individual system components 2a, 2b, 2c 3 by means of the service appliance 6, via the interface device 5.

The illustrated process control system offers the capability to call all process-related data at any desired measurement point. The data interchange which is required for this purpose between the system components 2a, 2b, 2c, 3 takes place via bidirectionally operating data interchange means 4a, 4b, 4c and 4d. For example, it is thus possible to read the pressure recorded in a measurement device 2b and a flow determined in the measurement device 2c at a temperature measurement point 2a. In this case, pressure and temperature data are passed on directly via point-to-point links 4b and 4a, while the flow is determined from the pressure and temperature data, and the data from the flowmeter 2c. It is self-evident that other data transmission means, for example bus systems, are also suitable, in addition to point-to-point links. The local preprocessing of the data and the interchange of all data furthermore make it possible to obtain the actually process-relevant variables. In principle, there is therefore no need for central processing of the measurement values. This simplifies the control process for the local operator and reduces the hardware complexity, since, for example, a PDA or a notebook is sufficient for reading. However, this does not preclude the possibility, if required, of nevertheless also providing a control console, from which data can be read or parameter changes can be implemented.

The interchange of the measurement values between the components of the process control system and the local processing of the data also offers capabilities for diagnosis of individual sensors and of the overall system, since this type of information interchange is not limited to instruments, but also includes actuators. Thus, for example a valve regulator can pass on information relating to the valve position to adjacent flowmeters which themselves pass back a message which states whether the message "valve closed" also actually results in "zero" flow.

Furthermore, the operating data can be used to carry out self-diagnosis in the respective interface device, for example by means of plausibility checks, provided that suitable algorithms are stored there.

The invention claimed is:

1. A process control system comprising measurement devices and actuators wherein
   a) all the measurement devices and actuators contain means for information processing and for data interchange between the measurement devices and actuators,
   b) all the measurement devices and actuators are connected by means for bidirectional data interchange, and
   c) a plurality of the measurement devices and actuators have means for data interchange with a service appliance which can be connected,
   wherein the means for data interchange with a service appliance which can be connected are an interface device for bi-directional data interchange and a plug-in apparatus, with the interface device being designed to provide current data relating to a process state for calling up.

2. The process control system as claimed in claim 1, wherein the means for information processing and for data interchange between the measurement devices and actuators are a microcomputer with interface devices for bidirectional data interchange.

3. The process control system as claimed in claim 1, wherein a bus system, to which all of the measurement devices and actuators are connected, is provided as the means for bidirectional data interchange.

4. The process control system as claimed in claim 1, wherein a laptop or a PDA is used as the service appliance which can be connected.

5. The process control system as claimed in claim 1, wherein the measurement devices and actuators are designed to carry out plausibility checks and diagnoses.

6. The process control system as claimed in claim 1, wherein the measurement devices and actuators are designed for preprocessing of recorded data.

7. A method for operation of a process control system as claimed in claim 1, wherein
   data which has been recorded in measurement devices of the process control system by sensors of the measurement devices and has possibly been obtained by preprocessing is linked to data from other measurement devices, and all of the data is stored and is transmitted to respective other measurement devices and to actuators, and
   data which has been called up from a service device which is connected to measurement devices or actuators is emitted.

8. The method as claimed in claim 7, wherein self-diagnoses are carried out in the components of the process control system, whose results are likewise stored such that they can be called up by a service device.

9. The process control system as claimed in claim 2, wherein the means for data interchange with a service appliance which can be connected are an interface device for bi-directional data interchange and a plug-in apparatus, with the interface device being designed to provide current data relating to a process state for calling up.

10. The process control system as claimed in claim 9, wherein point-to-point links are produced as means for bidirectional data interchange.

11. The process control system as claimed in claim 10, wherein a bus system, to which all of the measurement devices and actuators are connected, is provided as the means for bidirectional data interchange.

12. The process control system as claimed in claim 11, wherein a laptop or a PDA is used as the service appliance which can be connected.

13. The process control system as claimed in claim 12, wherein the measurement devices and actuators are designed to carry out plausibility checks and diagnoses.

14. The process control system as claimed in claim 13, wherein the measurement devices and actuators are designed for preprocessing of recorded data.

15. A method for operation of a process control system as claimed in claim 14, wherein:
   data which has been recorded in measurement devices of the process control system by sensors of the measurement devices and has possibly been obtained by preprocessing is linked to data from other measurement devices, and all of the data is stored and is transmitted to the respective other measurement devices and to actuators, and
   data which has been called up from a service device which is connected to measurement devices or actuators is emitted.

16. A process control system, comprising:
   measurement devices and actuators, each of which includes means for information processing and for data interchange between the measurement devices and actuators;
   means for interconnecting the measurement devices and actuators for bidirectional data interchange; and
   means, provided with multiple ones of the measurement devices and actuators, for data interchange with a service appliance which can be connected,
   wherein the means for data interchange with a service appliance which can be connected are an interface device for bi-directional data interchange and a plug-in apparatus, with the interface device being designed to provide current data relating to a process state for calling up.

* * * * *